United States Patent
Aoki et al.

(10) Patent No.: US 9,758,023 B2
(45) Date of Patent: Sep. 12, 2017

(54) SPRING FOR SUN VISOR AND SUPPORT DEVICE FOR SUN VISOR

(71) Applicant: PIOLAX, INC., Yokohama-shi (JP)

(72) Inventors: Ryou Aoki, Yokohama (JP); Moto Nakagawa, Yokohama (JP)

(73) Assignee: PIOLAX, INC., Yokohama-shi, Kanagawa (JP)

(*) Notice: Subject to any disclaimer, the term of this patent is extended or adjusted under 35 U.S.C. 154(b) by 0 days.

(21) Appl. No.: 15/036,264

(22) PCT Filed: Nov. 13, 2013

(86) PCT No.: PCT/JP2013/006683
§ 371 (c)(1),
(2) Date: May 12, 2016

(87) PCT Pub. No.: WO2015/071930
PCT Pub. Date: May 21, 2015

(65) Prior Publication Data
US 2016/0288626 A1 Oct. 6, 2016

(51) Int. Cl.
*B60J 3/00* (2006.01)
*B60J 3/02* (2006.01)
(Continued)

(52) U.S. Cl.
CPC .......... *B60J 3/0265* (2013.01); *B60J 3/0239* (2013.01); *F16F 1/025* (2013.01); *F16F 1/16* (2013.01);
(Continued)

(58) Field of Classification Search
CPC ........ B60J 3/0265; B60J 3/0239; F16F 1/025; F16F 1/16; F16F 2230/0011; F16F 2232/02; F16F 2234/06
See application file for complete search history.

(56) References Cited

U.S. PATENT DOCUMENTS 4,070,054 A * 1/1978 Cziptschirsch ............ B60J 3/02
16/342
4,469,367 A 9/1984 Kuttler et al.
(Continued)

FOREIGN PATENT DOCUMENTS

JP    H 10-35276 A    2/1998
JP    2001-158231 A   6/2001
(Continued)

OTHER PUBLICATIONS

International Search Report (ISR) (PCT Form PCT/ISA/210), in PCT/JP2013/006683, dated Jan. 14, 2014.

*Primary Examiner* — Lori L Lyjak
(74) *Attorney, Agent, or Firm* — McGinn IP Law Group, PLLC (57) ABSTRACT

A spring for sun visors includes a torque application section that extends from a holding section and applies torque when a main section is rotating. The holding section has a flat section that receives torque from a shaft. The torque application section has a first spring piece extending from one end of the holding section and a second spring piece extending from the other end of the holding section and being bent so as to fold back. The first spring piece has a first tip section that includes overhanging sections that are narrower than the width of the holding section. The second spring piece has a second tip section that is arranged so as to overlap on the outside of the overhanging sections. The overhanging sections are provided in an area extending from the torque receiving section to the first tip section.

7 Claims, 8 Drawing Sheets (51) Int. Cl.
 *F16F 1/16* (2006.01)
 *F16F 1/02* (2006.01)
(52) U.S. Cl.
 CPC ... *F16F 2230/0011* (2013.01); *F16F 2232/02* (2013.01); *F16F 2234/06* (2013.01)

(56) References Cited

U.S. PATENT DOCUMENTS

| | | | | |
|---|---|---|---|---|
| 5,563,483 A | * | 10/1996 | Kowall | E05L 381/14 318/266 |
| 6,010,174 A | * | 1/2000 | Murdock | B60J 3/0239 296/97.11 |
| 2013/0119697 A1 | * | 5/2013 | Asai | B60J 3/0217 296/97.13 |

FOREIGN PATENT DOCUMENTS

| | | |
|---|---|---|
| JP | 2005-119536 A | 5/2005 |
| JP | 2009-248931 A | 10/2009 |

* cited by examiner

SPRING FOR SUN VISOR AND SUPPORT DEVICE FOR SUN VISOR

TECHNICAL FIELD

The present invention relates to a sun visor spring that provides a torque to a main body of a sun visor in a vehicle, and a supporting device including the same.

BACKGROUND ART

A sun visor to protect, for example, the driver's eyes from direct sunlight to secure the driver's sight is provided on a ceiling surface in front of driver and passenger seats in a vehicle. The sun visor is provided such that its position is adjustable with respect to the sun's position.

A sun visor structure for a vehicle described in Patent Document 1 includes a sun visor main body having a plate shape, a shaft rotatably attached to a vehicle body, a support rotatably supported by the shaft and having the sun visor main body attached thereto, and a spring attached to the support. The spring includes a spring main body that straddles the shaft, and a pair of bifurcated spring pieces that is connected to the spring main body and is attached to a spring attaching portion provided to the support.

The pair of bifurcated spring pieces have distal ends both of which have a line shape in the axial direction, and have plain surfaces in distal end portions thereof that are caught by each other. When the sun visor main body is rotated, the spring main body receives a reaction force from the shaft, and a torque is conveyed from one of the spring pieces to the other one.

CITATION LIST

Patent Document

Patent Document 1

JP-2009-248931-A

SUMMARY OF THE INVENTION

Problem that the Invention is to Solve

In the technique described in Patent Document 1, when a torque is conveyed from one of the spring pieces to the other one when the sun visor main body is rotated, the spring attaching portion of the support could be deformed when the torque is increased.

The present invention is made in view of the above problems. An object of the present invention is to provide a technique for a supporting unit and a sun visor spring that are housed in a main body of a sun visor in a vehicle to prevent a deformation of the supporting unit.

Means for Solving the Problem

To solve the problem described above, one embodiment of the present invention provides a sun visor spring that is attached to a supporting unit disposed in a housing space formed in a main body of a sun visor in a vehicle, and that provides a torque to the main body when the main body is rotated, the sun visor spring including: a holding portion that straddles to hold a shaft inserted into the main body; and a torque providing portion that extends from the holding portion and that provides a torque to the main body via the supporting unit when the main body is rotated. The holding portion includes a torque receiving portion that receives a torque from the shaft by relatively rotating with respect to the shaft. The torque providing portion includes a first spring piece extending from one end of the holding portion, and a second spring piece extending from the other end of the holding portion to be bent and folded back. The first spring piece is inserted between wall portions on both sides of the supporting unit, and includes a first distal end portion including a flange portion having a width smaller than a width of the holding portion in an axial direction. The second spring piece is inserted between the wall portions on the both sides of the supporting unit, and includes a second distal end portion that overlaps with an outside of the flange portion. And, the flange portion being disposed in a region extending from the torque receiving portion to the first distal end portion.

According to the present embodiment, the width of the flange portion of the first spring piece of the sun visor spring is made smaller than the width of the holding portion in the axial direction. Thus, the rigidity can be reduced, and the wall portions on the both sides of the supporting unit that abut on the flange portion can be prevented from being deformed. In addition, the flange portion is provided in the region that extends from the torque receiving portion to the first distal end portion. Thus, a torque to be received by the torque receiving portion can be efficiently conveyed to the flange portion provided on an extension of an operating surface of the torque receiving portion.

Another embodiment of the present invention provides a supporting device for a sun visor. The supporting device includes: a supporting unit disposed in a housing space formed in a main body of the sun visor in a vehicle; and a sun visor spring that is attached to the supporting unit and that provides a torque to the main body when the main body is rotated. The supporting unit includes a first side wall portion, and a second side wall portion opposed to the first side wall portion. The sun visor spring includes: a holding portion that straddles to hold a shaft inserted into the main body; and a torque providing portion that extends from the holding portion and that provides a torque to the main body via the first side wall portion or the second side wall portion when the main body is rotated. The holding portion includes a torque receiving portion that receives a torque from the shaft by relatively rotating with respect to the shaft. The torque providing portion includes a first spring piece extending from one end of the holding portion, and a second spring piece extending from the other end of the holding portion to be bent and folded back. The first spring piece is inserted between the first side wall portion and the second side wall portion, and includes a first distal end portion including a flange portion having a width smaller than a width of the holding portion in an axial direction. The second spring piece is inserted between the first side wall portion and the second side wall portion, and includes a second distal end portion that overlaps with an outside of the flange portion. And, the flange portion being disposed in a region extending from the torque receiving portion to the first distal end portion.

According to the present embodiment, the width of the flange portion of the first spring piece of the sun visor spring is made smaller than the width of the holding portion in the axial direction. Thus, the rigidity can be reduced, and the first side wall portion and the second side wall portion that abut on the flange portion can be prevented from being deformed. In addition, the flange portion is provided in the region that extends from the torque receiving portion to the first distal end portion. Thus, a torque to be received by the torque receiving portion can be efficiently conveyed to the flange portion provided on an extension of an operating surface of the torque receiving portion.

Advantageous Effects of Invention

According to the present invention, with a supporting unit and a sun visor spring that are housed in a main body of a sun visor in a vehicle, the supporting unit can be prevented from being deformed.

MODE FOR CARRYING OUT THE INVENTION

Figure 1:
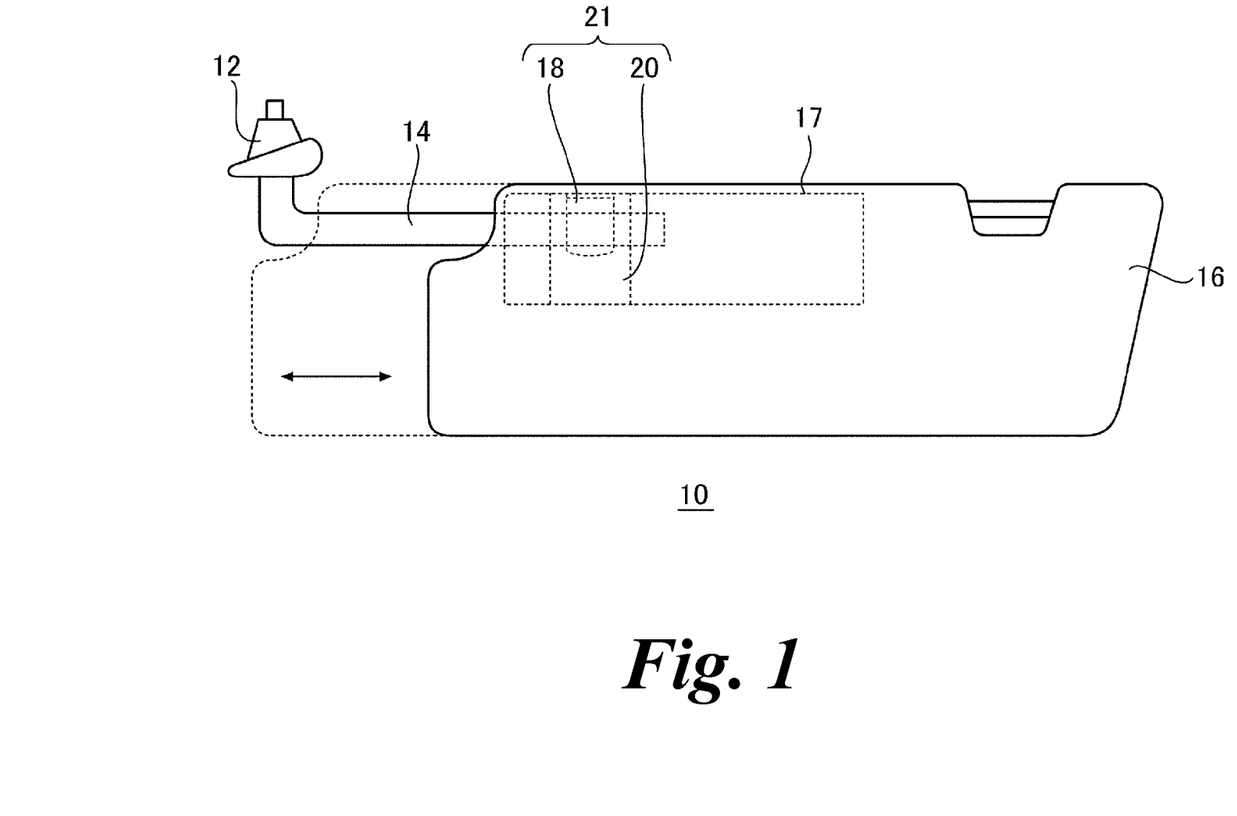
FIG. 1 is a front view of a sun visor.

FIG. 1 is a front view of a sun visor 10. The sun visor 10 is fixed to a vehicle body panel at a ceiling of driver and passenger seats in a vehicle, and is used to prevent a driver and a passenger from being dazzled or dizzied by sunlight or light of oncoming cars. The sun visor 10 rotatably moves such that the position of the sun visor 10 is adjustable.

The sun visor 10 includes a mounting portion 12, a shaft 14, a main body 16, a sun visor spring 18, and a supporting unit 20. The mounting portion 12 mounts the sun visor 10 to the vehicle body to rotatably move. The shaft 14 has a rod shape, a portion of which is inserted into a housing space 17 of the main body 16. The main body 16 is rotatably shaft-supported by the shaft 14. The main body 16 includes a light or a mirror (not illustrated), and a harness (not illustrated) is installed inside the shaft 14 to distribute power to the light of the main body 16. A retainer (not illustrated) is provided to the distal end of the shaft 14.

The main body 16 is made of two joined flat plates, and the housing space 17 to house the supporting unit 20 is formed inside the main body 16. The main body 16 is slidable in the axial direction with respect to the shaft 14 and the supporting unit 20.

The sun visor spring 18 provides a torque to the main body 16 when the main body 16 is rotated. The sun visor spring 18 is made of a metallic plate material. The supporting unit 20 is made of resin, and is held by the shaft 14. The supporting unit 20 is disposed in the housing space 17, and supports the main body 16 so as to be slidable with respect to the shaft 14. In addition, the supporting unit 20 prevents the main body 16 from rattling against the shaft 14. The sun visor spring 18 is attached to be integrated with the supporting unit 20, which configures a supporting device 21.

Figure 2A:
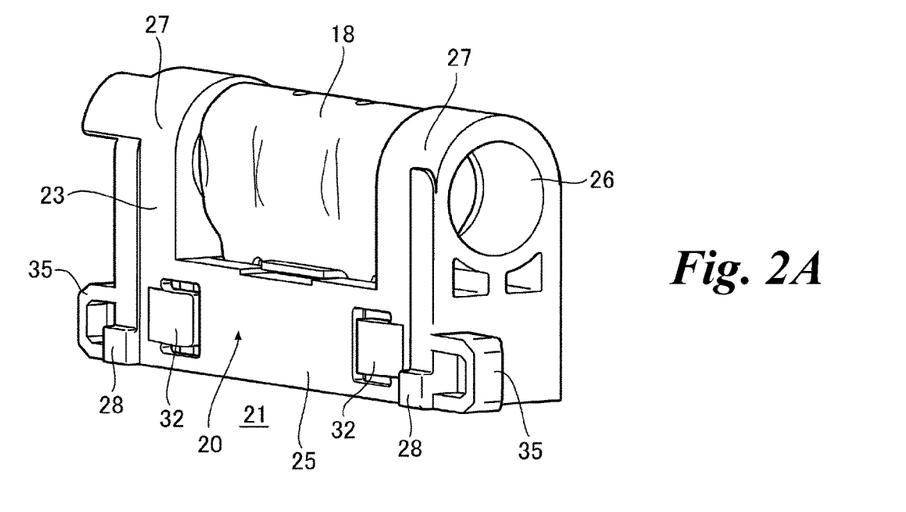
FIG. 2A is a perspective view of a supporting device showing one lateral face.
Figure 2B:
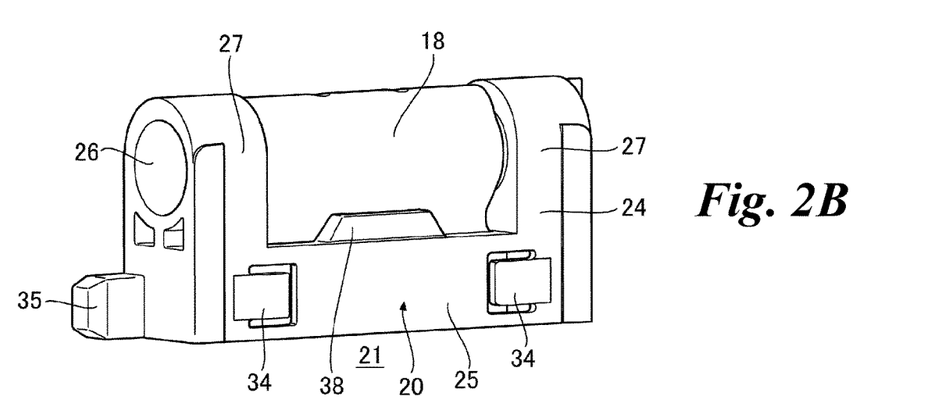
FIG. 2B is a perspective view of the supporting device showing the other lateral face.
Figure 3:
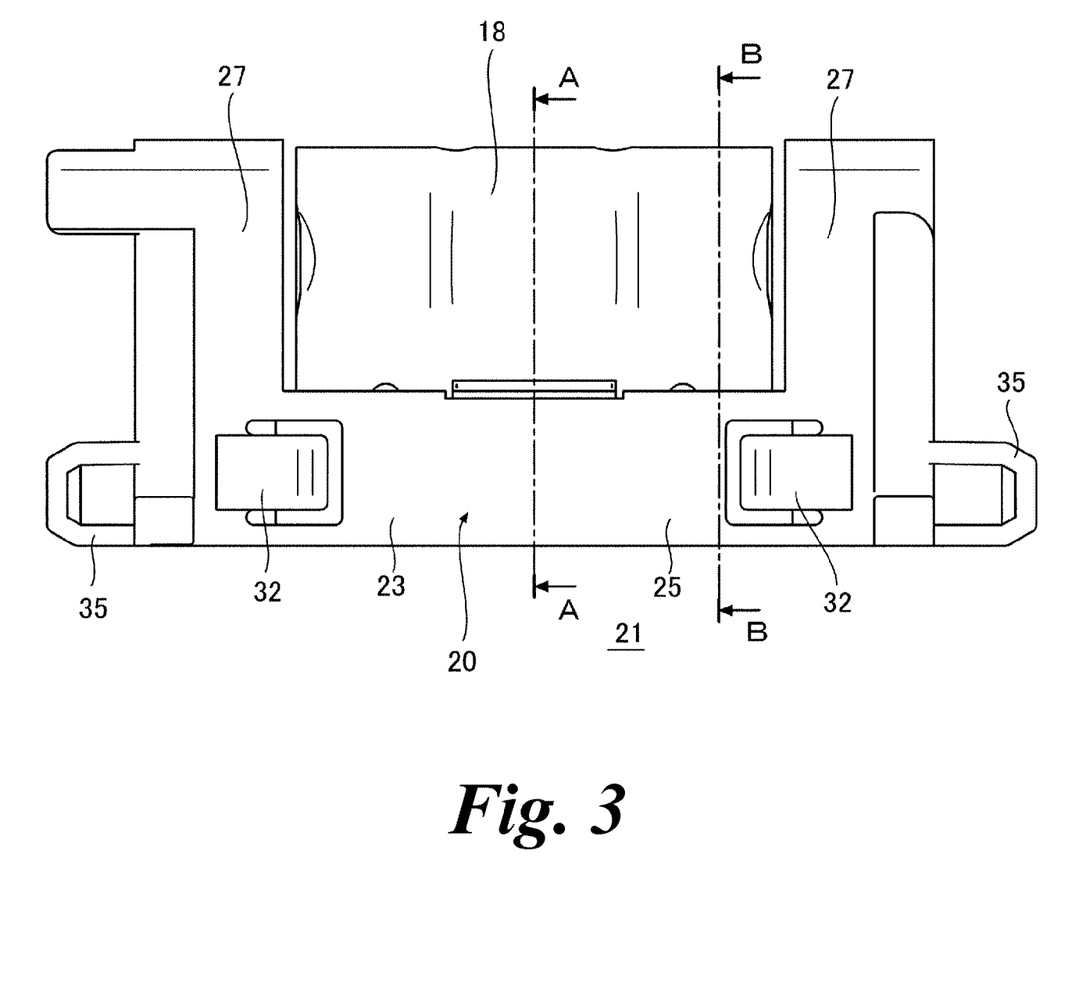
FIG. 3 is a front view of the supporting device showing one front face.
Figure 4A:
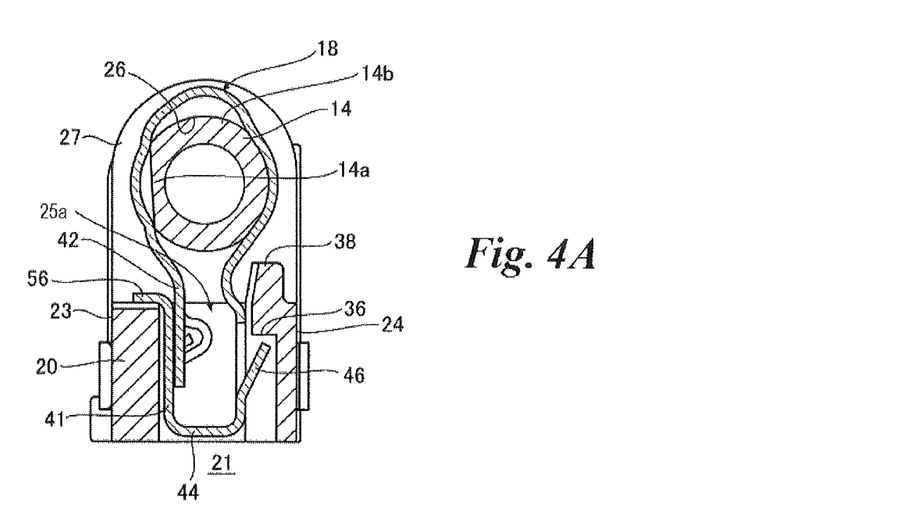
FIG. 4A is a cross-sectional view of the supporting device taken along the line A-A in FIG. 3.
Figure 4B:
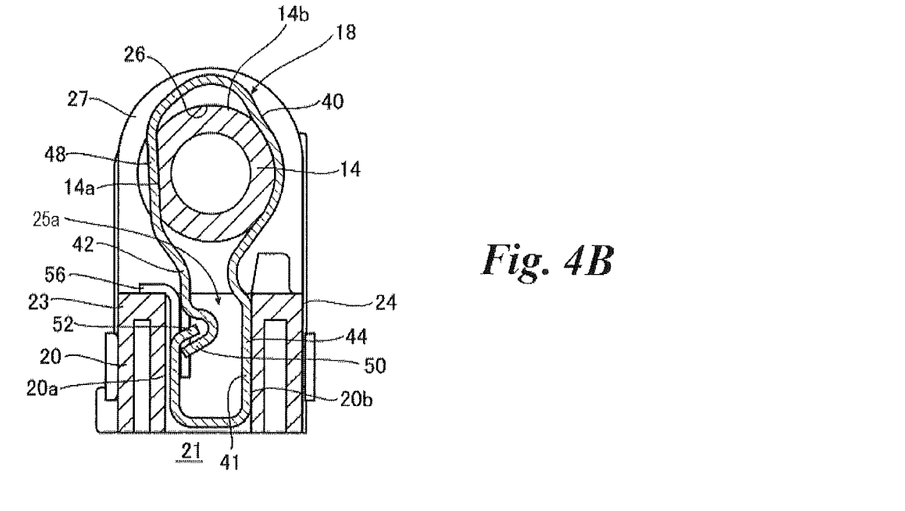
FIG. 4B is a cross-sectional view of the supporting device taken along the line B-B in FIG. 3.

FIG. 2A is a perspective view of the supporting device 21 showing one lateral face, and FIG. 2B is a perspective view of the supporting device 21 showing the other lateral face. FIG. 3 is a front view of the supporting device 21 showing one front face. FIG. 4A is a cross-sectional view of the supporting device 21 taken along the line A-A in FIG. 3, and FIG. 4B is a cross-sectional view of the supporting device 21 taken along the line B-B in FIG. 3. FIG. 4 shows states where the shaft 14 is inserted into a shaft hole 26. It is to be noted that same or equivalent constituent elements shown in the drawings are provided with same reference numerals, and repeated descriptions of the same or equivalent constituent elements are omitted as appropriate.

The sun visor spring 18 defines a leaf spring shaped into an approximate cylinder that is bent so as to surround the outer periphery of the shaft 14. The sun visor spring 18 is fixed to the supporting unit 20, and holds to sandwich the shaft 14. When the main body 16 is rotated about the shaft 14, the sun visor spring 18 and the supporting unit 20 are also rotated.

The supporting unit 20 includes a pair of bearings 27 including the shaft hole 26, a connecting portion 25 that connects the pair of bearings 27, a pair of first elastic tongue piece covers 32 provided to a first lateral face 23, a pair of second elastic tongue piece covers 34 provided to a second lateral face 24. Further, the supporting unit 20 includes a pair of guide portions 28 provided to the first lateral face 23, a pair of protruding portions 35 provided to the both ends in the axial direction, a stopper portion 38 that controls the insertion direction of the sun visor spring 18 when the sun visor spring 18 is inserted, and a retaining portion 36 that retains the sun visor spring 18. The retaining portion 36 functions as an attaching portion to which the sun visor spring 18 is attached.

A space to house the sun visor spring 18 is provided between the pair of bearings 27. One insertion hole 25a is formed in the connecting portion 25 between the pair of bearings 27. A portion of the sun visor spring 18 is inserted into the insertion hole 25a. The width of the insertion hole 25a in the axial direction is slightly larger than the width of the sun visor spring 18 in the axial direction. Thus, an operator can easily attach the sun visor spring 18 to the supporting unit 20. The connecting portion 25 includes a first side wall portion 20a on the side of the first lateral face 23, and a second side wall portion 20b on the side of the second lateral face 24 that is parallel to the first side wall portion 20a. The first side wall portion 20a and the second side wall portion 20b are referred to simply as the side wall portions or the both side wall portions when the wall portions are not distinguished from each other. The first elastic tongue piece covers 32 and the second elastic tongue piece covers 34 are flexible, and elastically abut on the inner wall face of the housing space 17 to prevent the supporting unit 20 from rattling. In addition, when the main body 16 is slid in the axial direction with respect to the shaft 14 and the supporting unit 20, the first elastic tongue piece covers 32 and the second elastic tongue piece covers 34 produce slide resistance.

The guide portions 28 are engaged with the inner wall face of the housing space 17 to guide the sliding of the main body 16. A recess portion (not illustrated) that extends along the axial direction is formed on the inner wall face of the housing space 17, and the guide portions 28 are engaged with the recess portion. The stopper portion 38 extends into the insertion hole 25a for the sun visor spring 18 between the pair of bearings 27 on the second lateral face 24.

As shown in FIG. 4A, a torque providing portion 41 is housed in the insertion hole 25a of the supporting unit 20, and a first hook portion 46 of the torque providing portion 41 is formed so as to be hooked on the step-like retaining portion 36. The torque providing portion 41 is disposed between the first side wall portion 20a and the second side wall portion 20b of the supporting unit 20.

Figure 5A:
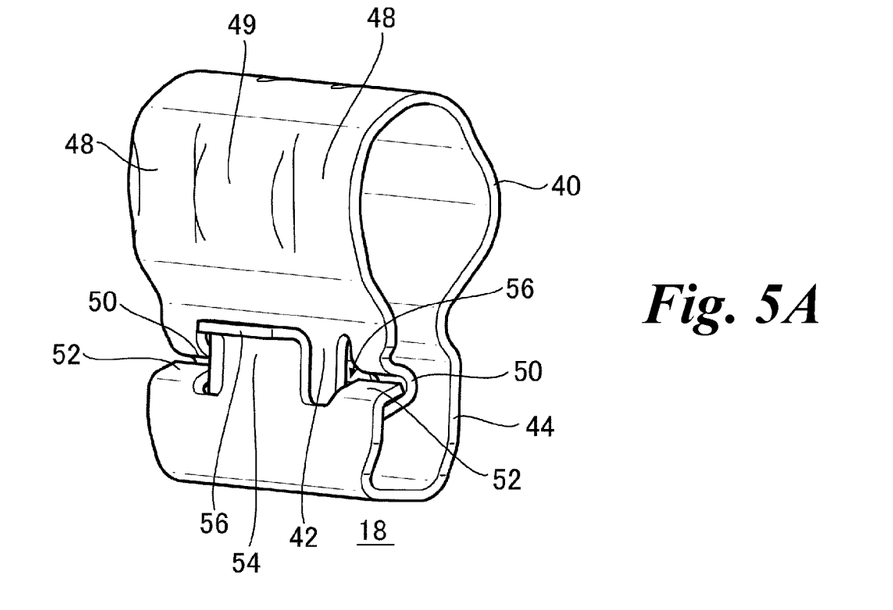
FIG. 5A is a perspective view of a sun visor spring showing the side with a joint.
Figure 5B:
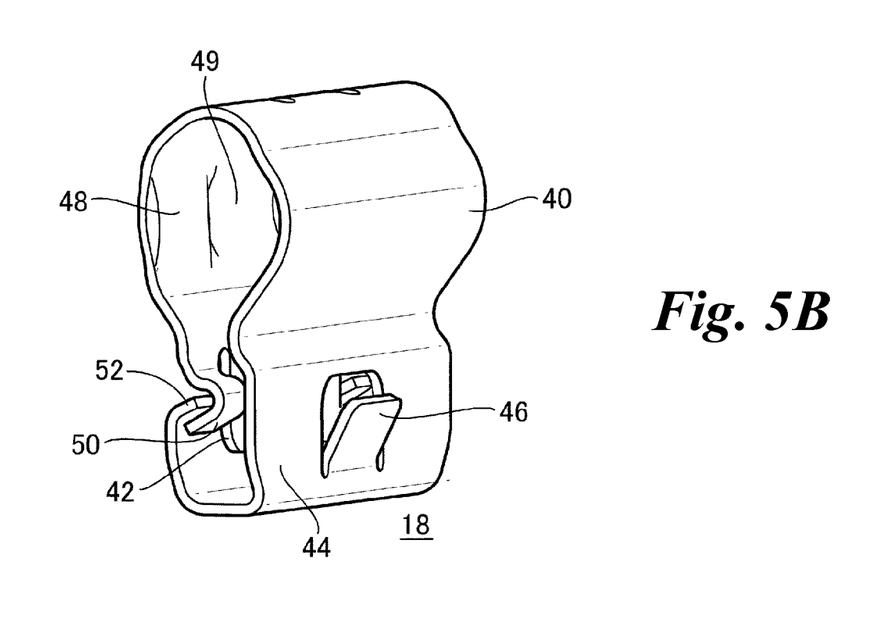
FIG. 5B is a perspective view of the sun visor spring showing the side with no joint.
Figure 6A:
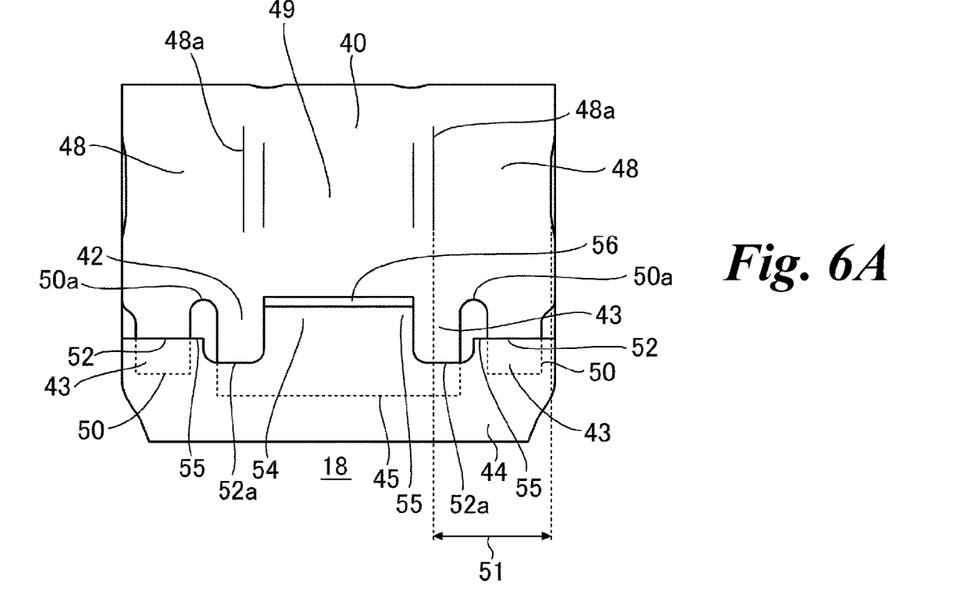
FIG. 6A is a front view of the sun visor spring on the side with a joint.

FIG. 5A is a perspective view of the sun visor spring 18 showing the side with a joint, and FIG. 5B is a perspective view of the sun visor spring 18 showing the side with no joint. FIG. 6A is a front view of the sun visor spring 18 on the side with a joint, and FIG. 6B is a side view of the sun visor spring 18.

Figure 6B:
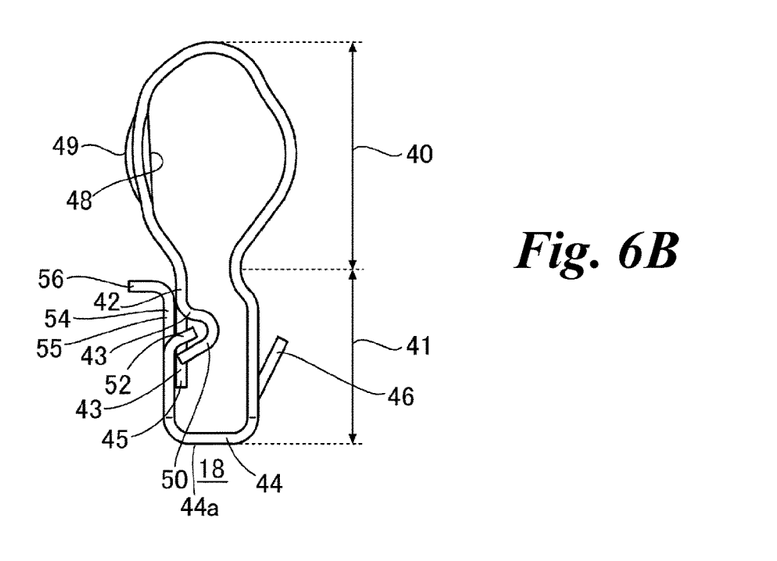
FIG. 6B is a side view of the sun visor spring.

As shown in FIG. 6B, the sun visor spring 18 includes the holding portion 40 that straddles to hold the shaft 14, and the torque providing portion 41 that provides a torque to the main body 16.

The holding portion 40 is bent so as to be able to hold the shaft 14, and has an approximately circular arc shape in cross section. The holding portion 40 includes a pair of flat portions 48 having a flat shape on the both sides in the axial direction. A circular arc portion 49 is formed between the pair of flat portions 48. The circular acc portion 49 is along the shape of the outer peripheral surface of the shaft 14, that is, in accordance with the curvature factor of the outer periphery of the shaft 14. The holding portion 40 is attached so as to sandwich the shaft 14.

The torque providing portion 41 extends from the holding portion 40, and is attached to the supporting unit 20. The torque providing portion 41 includes a first spring piece 42 that extends from one end of the holding portion 40, and a second spring piece 44 that extends from the other end of the holding portion 40 to be bent and folded back, where the distal end of the first spring piece 42 overlaps with the distal end of the second spring piece 44. The first spring piece 42 and the second spring piece 44 are opposed to each other at the portions that extend from the holding portion 40. The second spring piece 44 further extends than the first spring piece 42 to be folded back and extends until the distal end of the first spring piece 42, and the distal ends of the first spring piece 42 and the second spring piece 44 overlap with each other. The flat portions 48 are formed on the side of the first spring piece 42 disposed on the first lateral face 23.

As shown in FIG. 6A, a first distal end portion 43 of the first spring piece 42 is disposed so as to overlap with the inside of a second distal end portion 55 of the second spring piece 44. The state where the first distal end portion 43 overlaps with the second distal end portion 55 defines a state where the first distal end portion 43 abut on or in the vicinity of the second distal end portion 55, which includes a state where the first distal end portion 43 does not abut on the second distal end portion 55. The state where flange portions 50 overlap with engagement portions 52 also defines a state where the flange portions 50 abuts on or in the vicinity of the engagement portions 52, which includes a state where the flange portions 50 does not abut on the engagement portions 52. The first distal end portion 43 and the second distal end portion 55 are regions of the first spring piece 42 and the second spring piece 44 including free ends.

The first distal end portion 43 is divided into plural portions as a split tip shape. The first distal end portion 43 includes the pair of flange portions 50 disposed on the both sides in the axial direction, and a first middle portion 45 having a flat plate shape and formed between the pair of flange portions 50, and is divided into three portions. This configuration can reduce the rigidity of the first distal end portion 43. The flange portions 50 are bent so as to be recessed inward when viewed in the axial direction. The width of the flange portions 50 in the axial direction is smaller than the width of the first middle portion 45 that is smaller than the width of the holding portion 40 in the axial direction, and is equal to or less than the half of the width of the first middle portion 45 in the axial direction.

The second distal end portion 55 of the second spring piece 44 is divided into plural portions as a split tip shape. The second distal end portion 55 includes the pair of engagement portions 52 formed on the both sides in the axial direction, and a second middle portion 54 having a flat plate shape and formed between the pair of engagement portions 52, and is divided into three portions. This configuration can reduce the rigidity of the second distal end portion 55.

The engagement portions 52 get in to overlap with the recessed flange portions 50, and are engaged with and opposed close to the flange portions 50 as shown in FIG. 6B. A second hook portion 56 provided to the distal end of the second middle portion 54 is disposed so as to be hooked on the supporting unit 20 as shown in FIG. 4A. The second hook portion 56 abuts on the stopper portion 38 if an operator attaches the sun visor spring 18 in a wrong direction in attaching the sun visor spring 18 to the supporting unit 20, which can prevent the sun visor spring 18 from being wrongly attached.

Figure 7:
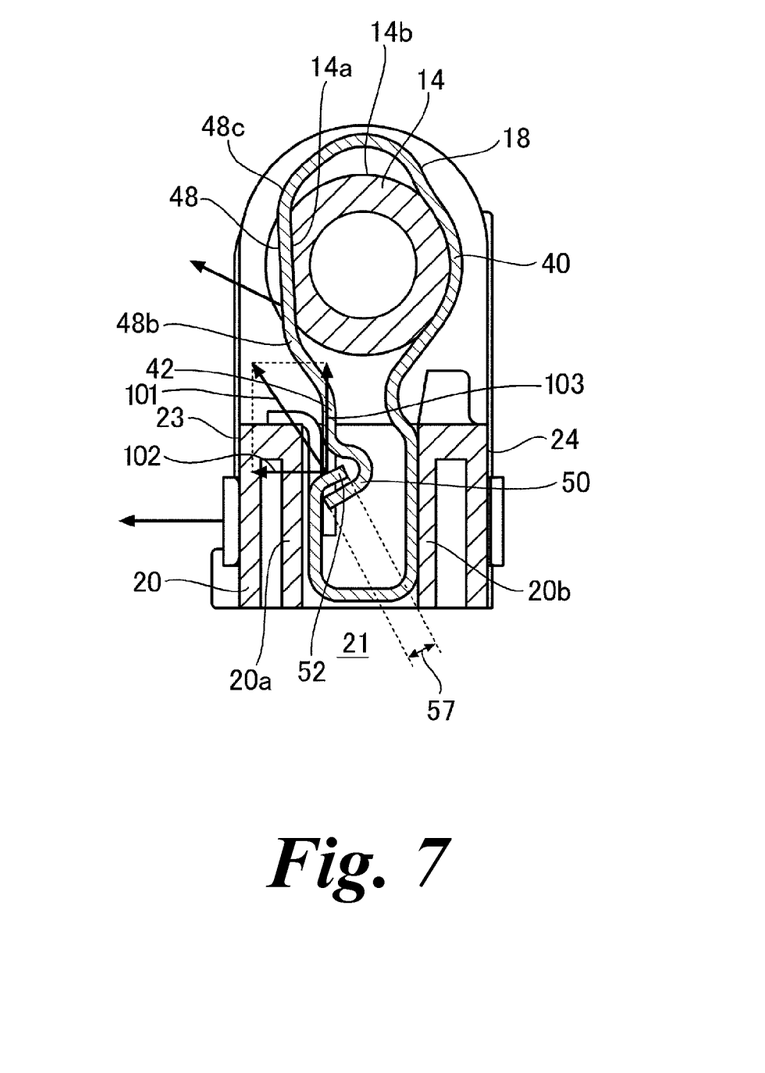
FIG. 7 is a view for illustrating the operation of the supporting device.

FIG. 7 is a view for illustrating the operation of the supporting device 21. The shaft 14 includes, on an outer peripheral surface thereof, a notch portion 14a that is made by notching the outer peripheral surface of the cylinder so as to be a flat shape, and a circular arc portion 14b having a circular arc shape in cross section. The flat portions 48 of the holding portion 40 are engaged with the flat-shaped notch portion 14a of the shaft 14. When the supporting unit 20 rotates about the shaft 14, the flat portions 48 receive a pressure force from the circular arc portion 14b. This is because the opposed space of the flat portions 48 in the holding portion 40 is smaller than the diameter of the shaft 14. Thus, the sun visor spring 18 is bent to provide a torque to the supporting unit 20. With this configuration, a torque can be provided when the main body 16 of the sun visor 10 is rotated, which can give operation feeling to the user. In addition, the sun visor spring 18 can make the main body 16 stand still at a given angle by the reaction force of the sun visor spring 18 to the shaft 14. The flat portions 48 function as a torque receiving portion that receives a torque from the shaft 14 by relatively rotating with respect to the shaft 14.

When the main body 16 rotates about the shaft 14 toward the first lateral face 23 from the second lateral face 24, the flat portions 48 of the holding portion 40 are pushed by the circular arc portion 14b of the shaft 14, and thus the first spring piece 42 receives a load toward the outside of the first lateral face 23, that is, in an opening direction.

In this case, the flange portions 50 press the supporting unit 20 together with the engagement portions 52 with which the flange portions 50 overlap, and thus the supporting unit 20 could expand. When the supporting unit 20 expands, friction could be produced on the inner wall face of the housing space 17 and the supporting unit 20 to shave the inner wall face of the housing space 17. In addition, the slide resistance that is produced when the main body 16 is slid in the axial direction with respect to the shaft 14 and the supporting unit 20 could be excessively increased. In order to solve these problems, by dividing the first distal end portion 43 of the first spring piece 42 into plural portions as a split tip shape, the rigidity of the first distal end portion 43 can be reduced more than the rigidity of a distal end portion having its tip not divided, and the pressure force applied from the circular arc portion 14b can be dispersed. Thus, the deformation amount of the flange portions 50 in the vertical direction to the first side wall portion 20a can be suppressed. Thus, the load applied to the supporting unit 20 can be suppressed, whereby the supporting unit 20 can be prevented from being deformed.

As shown in FIG. 6A, boundaries 48a between the flat portions 48 and the circular arc portion 49 are formed along the circumferential direction. The flange portion 50 is provided within a region overlapping with a region 51 that extends from the flat portion 48 to the first distal end portion 43, or within the region 51. While the region 51 extending from the flat portion 48 on the right side is shown in FIG. 6A, it is also provided with respect to the flat portion 48 on the left side. As shown in FIG. 7, the pair of flat portions 48 receive a torque from the shaft 14 while the circular arc portion 49 between the flat portions 48 little receives a torque. Thus, torques are produced on extensions of the flat portions 48 in the radial directions. The flange portions 50 are on operating surfaces of the flat portions 48 while the first middle portion 45 is on an operating surface of the circular arc portion 49, and the flange portions 50 and the first middle portion 45 are separated by slits. Thus, the torques to be received by the flat portions 48 can be prevented from being conveyed to the first middle portion 45 while can be efficiently conveyed to the flange portions 50. In addition, since the rigidity of the flange portions 50 is reduced, the supporting unit 20 can be effectively prevented from being deformed.

The engagement portions 52 and the second middle portion 54 are disposed so as to respectively overlap with the flange portions 50 and the first middle portion 45. The engagement portions 52 and the second middle portion 54 are separated by slits. Thus, the torques from the flange portions 50 are conveyed to the engagement portions 52 while the torque from the first middle portion 45 is conveyed to the second middle portion 54. In other words, the torques from the flange portions 50 can be prevented from being conveyed to the second middle portion 54. In addition, the torque from the first middle portion 45 is smaller than the torques from the flange portions 50, so that the torque received by the second middle portion 54 is accordingly smaller than the torques received by the engagement portions 52. Thus, the torque conveyed from the second middle portion 54 to the center portion of the first side wall portion 20a is small, which can prevent the center portion of the first side wall portion 20a from being deformed.

The flange portions 50 are provided on the both sides of the sun visor spring 18 in the axial direction. The both sides of the sun visor spring 18 in the axial direction define the both end sides in the axial direction or the vicinities of both ends in the axial direction. In the first side wall portion 20a of the supporting unit 20, the center portion is more flexible than the both end portions in the axial direction as shown in FIG. 2A. This is because the both ends of the first side wall portion 20a of the supporting unit 20 have the shape of both-ends-supported beams connected with the pair of bearings 27, so that the rigidity of the both ends is high while the center portion is more flexible. Since the flange portions 50 that receive bigger torques than the first middle portion 45 are formed on both sides in the axial direction, the supporting unit 20 can be further prevented from being deformed.

As shown in FIG. 7, overlapping surfaces 57 of the flange portions 50 and the engagement portions 52 are inclined to the flat portions 48 when viewed in the axial direction of the shaft 14, and are opposed close to each other. To be specific, the overlapping surfaces 57 of the flange portions 50 and the engagement portions 52 are inclined to a reference surface that passes through one ends 48b and the other ends 48c of the flat portions 48 in the circumferential direction when viewed in the axial direction of the shaft 14. In addition, the overlapping surfaces 57 of the flange portions 50 and the engagement portions 52 are inclined to the first side wall portion 20a. In the embodiment shown in FIG. 7, the reference surface that passes through one ends 48b and the other ends 48c defines the flat portions 48. The torques to be received by the flat portions 48 are conveyed from the flange portions 50 to the engagement portions 52. The torque 101 can be divided into a torque 102 in the vertical direction to the first side wall portion 20a and the torque 103 in the parallel direction to the first side wall portion 20a. By reducing the torque 102 in the vertical direction to the first side wall portion 20a, the supporting unit 20 can be prevented from being deformed. The first middle portion 45 and the second middle portion 54 are parallel to the flat portions 48. In addition, being bent, the flange portions 50 and the engagement portions 52 are higher in rigidity than the first middle portion 45 and the second middle portion 54, so that the flange portions 50 and the engagement portions 52 can produce relatively larger torques. To be specific, when received loads from the main body 16, the flange portions 50 and the engagement portions 52 produce torques larger than the first middle portion 45 and the second middle portion 54, which can prevent the center portion of the first side wall portion 20a from being deformed.

The roots of the flange portions 50, that is, first base end portions 50a are disposed closer to the first distal end portion 43 than the holding portion 40. The flange portions 50 are configured not to be disposed to the outer peripheral portion of the shaft 14. This configuration can distribute the torques while suppressing excessive reduction in rigidity in the holding portion 40 caused by forming the first distal end portion 43 into a split tip shape.

The roots of the engagement portions 52, that is, second base end portions 52a are disposed closer to the second distal end portion 55 than the folded back portion of the second spring piece 44. The folded back portion of the second spring piece 44 defines a lower end portion 44a shown in FIG. 6B. When the engagement portions 52 is longer, the rigidity of the second distal end portion 55 is reduced. This configuration can distribute the torques while suppressing excessive reduction in rigidity in the second distal end portion 55 caused by forming the second distal end portion 55 into a split tip shape.

Figure 8:
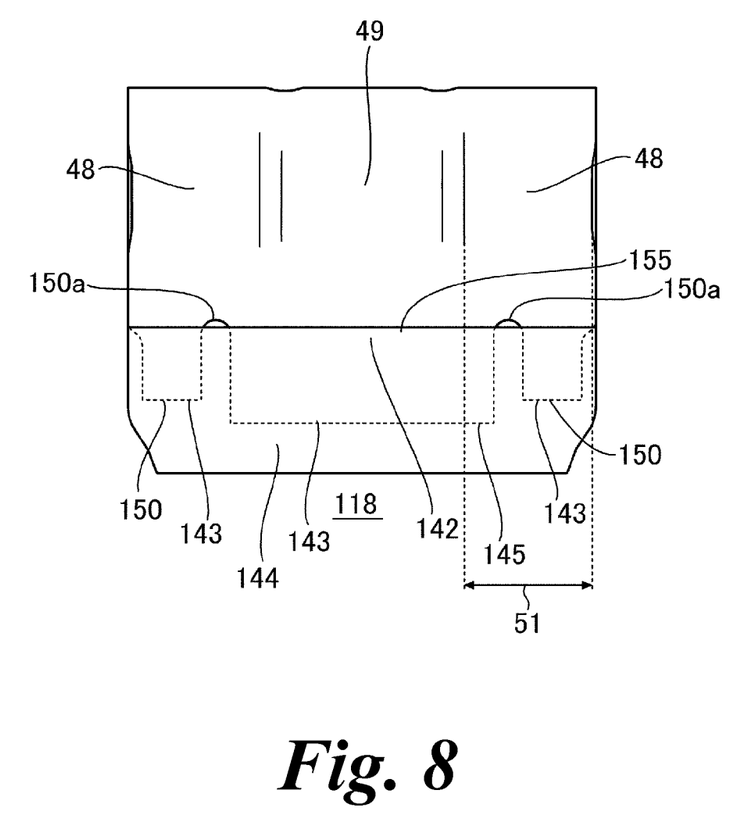
FIG. 8 is a front view of a sun visor spring according to a modification.

FIG. 8 is a front view of the sun visor spring 118 according to a modification. The sun visor spring 118 according to the modification includes a second spring piece 144 including a second distal end portion 155. The second distal end portion 155 is not formed into a split tip shape, but has a uniform flat plate shape. A first distal end portion 143 of a first spring piece 142 is disposed so as to overlap with the inside of the second distal end portion 155.

The first distal end portion 143 is divided into plural portions as a split tip shape. The first distal end portion 143 includes a pair of flange portions 150 formed on the both sides in the axial direction, and a first middle portion 145 that is flat and formed between the pair of flange portions 150. The flange portions 150 are flat, and the second distal end portion 155 is also flat. Base end portions 150a of the flange portions 150 are exposed when viewed from the front. That is, the flange portions 150 and the first middle portion 145 separately abut on the second distal end portion 155.

Also in the modification, the rigidity of the first distal end portion 143 can be reduced, and the torque conveyed to the support unit 20 can be reduced.

The pair of flange portions 150 are provided on the both sides of the sun visor spring 118 in the axial direction. Thus, a torque is conveyed to a portion of the supporting unit 20 that is not easily bent, whereby the supporting unit 20 can be prevented from being deformed. The flange portion 150 is provided within a region overlapping with the region 51 that extends from the flat portion 48 to the first distal end portion 143, or within the region 51. The pair of flat portions 48 receive a torque from the shaft 14 while the circular arc portion 49 between the flat portions 48 little receives a torque. Thus, torques are produced on extensions of the flat portions 48 in the radial directions. The flange portions 150 are on operating surfaces of the flat portions 48 while the first middle portion 145 is on an operating surface of the circular arc portion 49, and the flange portions 150 and the first middle portion 145 are separated by slits. Thus, the torques to be received by the flat portions 48 can be prevented from being conveyed to the first middle portion 145 while can be efficiently conveyed to the flange portions 150. In addition, since the rigidity of the flange portions 150 is reduced, the supporting unit 20 can be effectively prevented from being deformed.

The present invention is not limited to the embodiments described above, and it is also possible to add modifications such as various kinds of design changes to the embodiments based on the knowledge of those skilled in the art. Embodiments to which such modifications are added can also be included within the scope of the present invention. It is also possible to combine the modifications.

In the embodiment, the flat-shaped notch portion 14a is formed on the shaft 14. However, the present invention is not limited to this embodiment. It is sufficient if the notch portion 14a has a shape engageable with the flat portions 48, and for example, the notch portion 14a may have a recess portion. In addition, the flat portions 48 that function as the torque receiving portions may have a recess portion recessed inward in the radial directions.

In the embodiment, the pair of flange portions 50 and the first middle portion 45 are formed on the first distal end portion 43. However, the present invention is not limited to this embodiment. For example, the pair of flange portions 50 may be formed on the first distal end portion 43, and no first middle portion 45 may be formed between the flange portions 50. Thus, when the main body 16 is rotated, a load to be conveyed from the first middle portion 45 to the second middle portion 54 can be eliminated. For example, if a sufficient torque can be conveyed from the flange portions 50, the first middle portion 45 can be dispensed with.

In the embodiment, the first middle portion 45 is disposed so as to overlap with the second middle portion 54. However, the present invention is not limited to this embodiment. Thus, the first middle portion 45 may be configured to be bent toward the inside of the sun visor spring 18 and not to be in the vicinity of the second middle portion 54. Thus, when the main body 16 is rotated, a torque to be conveyed from the first middle portion 45 to the second middle portion 54 can be eliminated. The flange portions 50 and the second middle portion 54 may be provided not to abut on each other.

In the embodiment, the flat portions 48 are provided on the both sides in the axial direction and the circular arc portion 49 is provided therebetween while the flange portions 50 are provided on the both sides in the axial direction and the first middle portion 45 is provided therebetween. However, the present invention is not limited to this embodiment. For example, a pair of circular arc portions may be provided on the both sides of the holding portion 40 in the axial direction and a flat portion may be provided therebetween while a pair of first middle portions may be provided on the both sides in the axial direction and a flange portion may be provided therebetween.

DESCRIPTION OF REFERENCE NUMERALS AND SIGNS

10 Sun visor,
12 Mounting portion,
14 Shaft,
14a Notch portion,
16 Main body,
17 Housing space,
18 Sun visor spring,
20 Supporting unit,
20a First side wall portion,
20b Second side wall portion,
21 Supporting device,
23 First lateral face,
24 Second lateral face,
26 Shaft hole,
27 Bearing,
28 Guide portion,
32 First elastic tongue piece cover,
34 Second elastic tongue piece cover,
35 Protruding portion,
36 Retaining portion,
38 Stopper portion,
40 Holding portion,
41 Torque providing portion,
42 First spring piece,
43 First distal end portion,
44 Second spring piece,
45 First middle portion,
46 First hook portion,
48 Flat portion,
49 Circular arc portion,
50 Flange portion,
50a First base end portion,
52 Engagement portion,
52a Second base end portion,
54 Second middle portion,
55 Second distal end portion, and
56 Second hook portion.

INDUSTRIAL APPLICABILITY

The present invention relates to a sun visor spring that provides a torque to a main body of a sun visor in a vehicle, and a supporting device including the same.

The invention claimed is:

1. A sun visor spring that is attached to a supporting unit disposed in a housing space formed in a main body of a sun visor in a vehicle, and that provides a torque to the main body when the main body is rotated, the sun visor spring comprising:
   a holding portion that straddles to hold a shaft inserted into the main body; and
   a torque providing portion that extends from the holding portion and that provides a torque to the main body via the supporting unit when the main body is rotated,
   wherein the holding portion includes a torque receiving portion that receives a torque from the shaft by relatively rotating with respect to the shaft, wherein the torque providing portion includes
a first spring piece extending from one end of the holding portion, and
a second spring piece extending from the other end of the holding portion to be bent and folded back,
wherein the first spring piece is inserted between wall portions on both sides of the supporting unit, and includes a first distal end portion including a flange portion having a width smaller than a width of the holding portion in an axial direction,
wherein the second spring piece is inserted between the wall portions on the both sides of the supporting unit, and includes a second distal end portion that overlaps with an outside of the flange portion,
wherein the flange portion being disposed in a region extending from the torque receiving portion to the first distal end portion,
wherein the first distal end portion includes
the flange portions formed on both sides of the shaft in an axial direction, and
a first middle portion formed between the flange portions and overlapping with an inside of the second distal end portion, and
wherein the first distal end portion has a split tip shape formed by the flange portions and the first middle portion.

2. The sun visor spring of claim 1,
wherein the flange portions include base end portion disposed closer to the first distal end portion than a portion of the holding portion that abuts on the shaft.

3. The sun visor spring of claim 1,
wherein the second distal end portion includes
engagement portions formed on both sides of the shaft in the axial direction and overlapping with the outside of the flange portions, and
a second middle portion formed between the engagement portions and overlapping with an outside of the first middle portion, and
wherein the second distal end portion has a split tip shape formed by the engagement portions and the second middle portion.

4. The sun visor spring of claim 3,
wherein the engagement portions include base end portion disposed closer to the second distal end portion than the folded back portion.

5. The sun visor spring of claim 3,
wherein overlapping surfaces of the flange portions and the engagement portions are inclined to a reference surface that passes through one end and the other end in a circumferential direction of the torque receiving portion when viewed in the axial direction of the shaft.

6. The sun visor spring of claim 1,
wherein the flange portions are provided in the region that extends from the torque receiving portion to the first distal end portion in the first spring piece.

7. A supporting device for a sun visor, the supporting device comprising:
a supporting unit disposed in a housing space formed in a main body of the sun visor in a vehicle; and
a sun visor spring that is attached to the supporting unit and that provides a torque to the main body when the main body is rotated,
the supporting unit including
a first side wall portion, and
a second side wall portion opposed to the first side wall portion,
the sun visor spring including:
a holding portion that straddles to hold a shaft inserted into the main body; and
a torque providing portion that extends from the holding portion and that provides a torque to the main body via the first side wall portion or the second side wall portion when the main body is rotated,
wherein the holding portion includes
a torque receiving portion that receives a torque from the shaft by relatively rotating with respect to the shaft,
wherein the torque providing portion includes
a first spring piece extending from one end of the holding portion, and
a second spring piece extending from the other end of the holding portion to be bent and folded back,
wherein the first spring piece is inserted between the first side wall portion and the second side wall portion, and includes a first distal end portion including a flange portion having a width smaller than a width of the holding portion in an axial direction,
wherein the second spring piece is inserted between the first side wall portion and the second side wall portion, and includes a second distal end portion that overlaps with an outside of the flange portion,
wherein the flange portion being disposed in a region extending from the torque receiving portion to the first distal end portion,
wherein the first distal end portion includes
the flange portions formed on both sides of the shaft in an axial direction, and
a first middle portion formed between the flange portions and overlapping with an inside of the second distal end portion, and
wherein the first distal end portion has a split tip shape formed by the flange portions and the first middle portion.

* * * * *